Sept. 13, 1938.　　S. A. SCHERBATSKOY ET AL　　2,129,880
THERMIONIC MEASURING DEVICE
Filed June 12, 1937
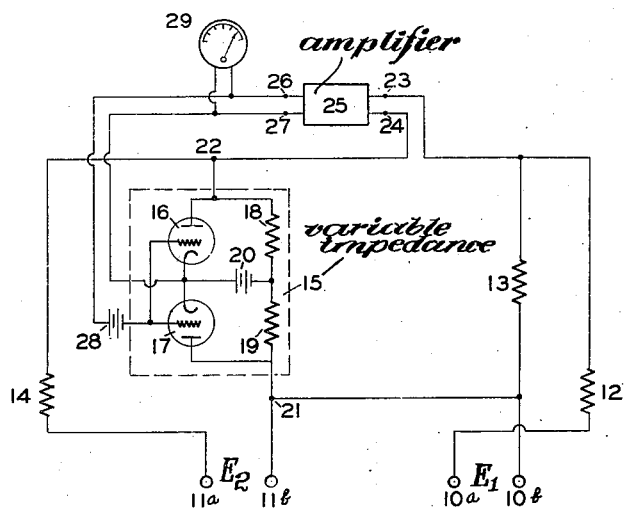
INVENTORS
Serge A. Scherbatskoy
Jacob Neufeld Patented Sept. 13, 1938

2,129,880

UNITED STATES PATENT OFFICE 2,129,880

THERMIONIC MEASURING DEVICE

Serge Alexander Scherbatskoy and Jacob Neufeld, Tulsa, Okla.

Application June 12, 1937, Serial No. 147,996

5 Claims. (Cl. 171—95)

Our invention relates to thermionic measuring devices, and in particular, to an arrangement for indicating progressively and continuously the ratio of two varying quantities or values.

The primary object of our invention is to provide an apparatus therefor, to accomplish division, wherein the dividend, divisor and their quotient may be located at distant or adjacent points, in any relative location whatsoever, their only interconnection being by means of electrical conductors.

In general, it is an object of our invention to provide a device which is substantially electrical in nature and which may be constructed in an efficient and compact manner similar to well-known electrical measuring devices or meters, such device thereby taking its place along with the vast number of other electrical measuring devices which are known to the art.

The novel features which we believe to be characteristic of our invention are set forth with particularity in the appended claims. Our invention itself, however, will be better understood by reference to the following description taken in connection with the accompanying single figure of drawing, which represents diagrammatically one of the preferred embodiments.

Referring now more particularly to the drawing, numerals $10a$, $10b$, and $11a$, $11b$ designate two pairs of terminals at which input voltages $E_1$ and $E_2$ are respectively applied. The terminals $10a$, $10b$ are connected to a circuit consisting of a resistance $12$ in series with a resistance $13$.

The terminals $11a$, $11b$ are connected to a circuit consisting of a resistance $14$ in series with a circuit arrangement designated by a block $15$, the said circuit arrangement comprising two three-electrode tubes $16$ and $17$ connected in push-pull, two resistors $18$, $19$ connected across the anodes of the tubes $16$, $17$ respectively and a battery $20$ inserted between the cathodes of the tubes $16$, $17$ and the common terminal of the resistors $18$, $19$ respectively. The terminal $21$ of $15$ is connected directly to one of the terminals of $13$ while the other terminal of $13$ and the terminal $22$ of $15$ are respectively connected to the input terminals $23$, $24$ of a D. C. amplifier $25$. The D. C. amplifier $25$ is of a push-pull type well known in the art. The output terminal $27$ of the amplifier $25$ is connected to the cathodes of the tubes $16$, $17$ and the output terminal $26$ is connected through the battery $28$ to the grids of the tubes $16$, $17$. Both output terminals $26$, $27$ are also connected to a voltmeter $29$. The voltmeter is provided with an appropriate scale and is adapted to indicate automatically and continuously the value $E_1/E_2$ expressing the ratio of the voltage $E_1$ across the terminals $10a$, $10b$ to the voltage $E_2$ across the terminals $11a$, $11b$.

The operation of this arrangement can be explained as follows:

Let R designate the resistance of $12$ or $14$, these two resistances being equal one to another and let $r_1$ designate the resistance of $13$. The electric circuit contained in the block $15$ and inserted between the terminals $21$, $22$ acts primarily as a resistance; let the latter be represented by $r_2$. It is apparent that the value of $r_2$ depends among other things upon the plate-cathode resistances of the tubes, $16$ and $17$.

On the other hand, the plate-cathode resistances of the tubes $16$, $17$ are functions of their grid biases, the latter being determined by the voltage between the terminals $26$, $27$.

Consequently, the voltage between the terminals $26$, $27$ can be used for controlling the equivalent resistance $r_2$ of the block $15$, and the magnitude of this voltage determines the value of the resistance $r_2$.

The current flowing from the terminal $10a$ into the resistor $12$ in series with the resistor $13$ and returning to the terminal $10b$ can be expressed as follows:

$$i_1 = \frac{E_1}{R+r_1} \quad (1)$$

Assuming that $r_1 \ll R$ the expression (1) reduces to $$i_1 = \frac{E_1}{R} \quad (2)$$

and the voltage across the terminals of the resistance $13$ can be expressed as follows:

$$v_1 = i_1 r_1 = \frac{E_1 r_1}{R} \quad (3)$$

In a similar manner, the current flowing from the terminal $11a$ into the resistor $14$ and traversing the block $15$ from the terminal $22$ to the terminal $21$ and entering into the terminal $11b$ can be expressed as follows:

$$i_2 = \frac{E_2}{R+r_2} \quad (4)$$

Assuming that $r_2 \ll R$ the expression (4) reduces to $$i_2 = \frac{E_2}{R} \quad (5)$$

and the voltage across the terminals 22 and 21 becomes:

$$v_2 = i_2 r_2 = \frac{E_2 r_2}{R} \tag{6}$$

The voltages $v_1$ and $v_2$ oppose each other in such a manner that the voltage $v_3$ across the input terminals 23, 24 of the D. C. amplifier 25 is equal to the difference of $v_1$ and $v_2$, i. e., $$v_3 = v_1 - v_2 = \frac{1}{R}[E_1 r_1 - E_2 r_2] \tag{7}$$

and the amplified voltage across the output terminals 26, 27 of the D. C. amplifier is:

$$v_4 = K v_3 = \frac{K}{R}[E_1 r_1 - E_2 r_2] \tag{8}$$

where K is the amplification factor.

The voltage $v_4$ in series with the voltage of the battery 28 constitutes the grid bias of the tubes 16, 17. It is apparent that $v_4$ determines the plate resistance of the tubes and also determines the resistance $r_2$ of the block 15. Under the conditions shown in the figure the value of $r_2$ is such as to render the expression $$v_3 = \frac{1}{R}[E_1 r_1 - E_2 r_2] \tag{9}$$

very small, i. e., $$v_3 \ll \frac{E_1 r_1}{R}$$

and $$v_3 \ll \frac{E_2 r_2}{R}$$

Assume that the expression (9) is zero, i. e., $$\frac{1}{R}[E_1 r_1 - E_2 r_2] = 0 \tag{10}$$

whence $$r_2 = \frac{E_1}{E_2} r_1 \tag{11}$$

It is seen from the Formula (11) that the magnitude of the resistance $r_2$ numerically expresses the ratio of the voltages $E_1$ and $E_2$. This can be derived also in the following manner:

Assuming that the voltage $v_4$ is proportional to the resistance $r_2$, i. e., let $$v_4 = \frac{1}{C} r_2 \tag{11}$$

where C is the coefficient of proportionality. It follows then from the expression (8) that $$v_4 = \frac{\frac{K E_1 r_1}{R}}{1 + \frac{K E_2 C}{R}} \tag{12}$$

Assume that the amplification factor K is very large and is such that $K E_2 C/R$ is large comparing with one. Then the Formula (12) can be simplified, since the value "one" in the denominator can be neglected. Then $$v_4 = \frac{\frac{K E_1 r_1}{R}}{\frac{K E_2 C}{R}} = \frac{r_1 E_1}{C E_2}$$

Consequently, the voltage $v_4$ is a measure of the ratio $E_1/E_2$. The degree of precision of the electronic divider depends upon the amplification factor K of the amplifier 25 and can be increased at will so as to approach as nearly as desired the ideal.

It is therefore, seen that the problem of determining the ratio of voltages across the terminals 10a, 10b and 11a, 11b, is equivalent to determining $r_2$, i. e., the resistance of the block 15 between the terminals 21 and 22. On the other hand, the value of $r_2$ is controlled and determined by the voltage $v_4$ across the terminals 26, 27. Consequently, in the expression (12) instead of measuring the value $r_2$ expressing the ratio $E_1/E_2$ it is sufficient to determine the voltage $v_4$ which corresponds to the given value of $r_2$.

In accordance with the above, the terminals 26, 27 are connected to the voltmeter 29 which is adapted to indicate directly the value $v_4$. It is apparent that to each value of $v_4$ corresponds a determined value of $r_2$ and also a determined value of $E_1/E_2$. Therefore, by changing the scale of the voltmeter 29 the latter can be adapted to indicate directly the value $E_1/E_2$.

It is therefore apparent that we have provided a means for determining the ratio of two electrical voltages by applying these voltages to an electric network comprising two input circuits. One of the input circuits is connected across the terminals 10a, 10b and includes the fixed impedance $r_1$ designated by 13. The other input circuit is connected across the terminals 11a, 11b and includes the variable impedance $r_2$ designated by the block 15. The variable impedance is controlled by the voltage across the terminals 26, 27. The voltage drops across the impedances $r_1$ and $r_2$ oppose each other and the difference between these voltages controls the voltage across the terminals 26, 27 and causes the variable impedance $r_2$ to change its value so as to decrease the magnitude of the said difference. The ratio of the electrical input voltages is determined by the value of the variable impedance $r_2$ and on the other hand the value of the impedance $r_2$ is indicated by the voltmeter 29.

If now the relative values of the voltages $E_1$ and $E_2$ change, the voltmeter 29 will indicate a new value of the ratio $E_1/E_2$ and, in general, in case of varying input voltages the voltmeter 29 will indicate automatically and continuously the instantaneous value of their ratio.

Assume for instance that the voltage $E_2$ increases and the voltage $E_1$ is maintained constant. Then the current $i_2$ and the voltage $v_2$ will also increase, and will cause a corresponding variation of the voltage $v_3$. Then the amplified voltage $v_4$ derived from the output terminals of 25 changes its value in such a manner as to cause a decrease of the resistance $r_2$ of the block 15. Then the voltage drop $v_2$ across the resistor $r_2$ becomes again substantially equal to the voltage drop $v_1$ across the resistor $r_1$ so that the relation (10) is again substantially satisfied. It should be noted however that in this case the resistance $r_2$ has a different and a smaller value which corresponds to a new and a smaller value of the ratio $E_1/E_2$. To this new value of $r_2$ corresponds the new value of $v_4$ which is directly indicated by the voltmeter 29.

It is apparent that the above described circuit is not capable of determining the exact value of the ratio of the voltages $E_1$ and $E_2$. Assume, for instance, that the conditions approach very closely an ideal case, i. e., let the error involved in the expression (11) be extremely small. Then the voltage $v_3$ determined by (7) will be extremely small and a considerable magnification would be required in order to make the voltage $v_4$ effective to influence the value of the resistance $r_2$. It is therefore seen that the degree of effectiveness of the circuit is controlled by the circuit constants (in particular by the amplification factor K of the amplifier 25) and can be increased at will to approach as nearly as desired the ideal conditions of exactitude. The degree of exactitude obtained in the diagram shown is sufficient and abundant for many purposes, but should additional rigor be desired it can readily be obtained by increasing the voltage amplification of the amplifier 25 or by other suitable means.

It is therefore apparent that we have provided a means for automatically and continuously indicating a ratio of two electrical quantities.

In view of our invention and disclosure, variations and modifications to meet individual whim or particular need will doubtless become evident to others skilled in the art, to obtain part or all of the benefits of our invention without copying the structure shown, and we, therefore claim all such in so far as they fall within the reasonable spirit and scope of our invention.

It is understood that when reference is made in claims to a "ratio" of two quantities it is intended to include in its meaning a value which is substantially and not always exactly equal to the ratio of the two quantities and can be considered as representing the ratio for many practical purposes.

What we claim as new and desire to secure by Letters Patent of the United States is:

1. In an instrument for indicating the ratio of two electrical voltages, an electrical network comprising two pairs of terminals, two impedances, the said terminals being adapted to receive the said voltages respectively, means responsive to the said voltages and delivering two currents across the said impedances, means responsive to the difference between the voltage drops across the respective impedances for acting upon one of the said impedances in a manner so as to decrease the magnitude of the said difference, and means for indicating the condition of the said one of the said impedances as a measure of the ratio of the said electrical voltages.

2. In a device responsive to the ratio of two electrical voltages, an electric network comprising two input circuits, means for applying the said voltages to the said input circuits respectively, a variable impedance in one of the said input circuits, a fixed impedance in the other of the said input circuits, the said two impedances causing voltages to appear across their respective terminals when the said two input circuits are subjected to the said two electric input voltages respectively, means responsive to the difference of the voltages across the fixed and the variable impedances for varying the variable impedance in a manner so as to decrease the magnitude of the said difference, means for indicating the value of the said variable impedance as a measure of the ratio of the said electrical input voltages.

3. In an instrument for indicating the quotient of two electrical voltages, an electrical network comprising two pairs of terminals, the said pairs of terminals being adapted to receive the said voltages respectively, means responsive to the said voltages for creating an unbalance in the said network, means responsive to the said unbalance for producing another voltage, the said other voltage decreasing the magnitude of the said unbalance, and means for indicating the value of the said other voltage as a measure of the said quotient.

4. An indicating system comprising two impedances each connected across a source of voltage, an electrical circuit responsive to the difference in the voltage drops across the two impedances for producing an electrical current, means responsive to the said current for controlling the value of one of the said impedances in a manner so as to reduce the difference between the said voltage drops, and means for indicating the magnitude of the said current.

5. In an instrument responsive to the ratio of two electrical quantities, means for causing the said quantities to produce two electrical currents respectively, means responsive to the difference between the said currents for changing the magnitude of one of the said currents in order to approach the magnitude of the other current, and means connected to the last named means for providing an indication of the ratio of said quantities.

SERGE A. SCHERBATSKOY.
JACOB NEUFELD.